(12) United States Patent
Xia et al.

(10) Patent No.: US 12,193,001 B2
(45) Date of Patent: Jan. 7, 2025

(54) METHODS, APPARATUS AND SYSTEMS FOR DATA TRANSMISSION USING BANDWIDTH PARTS

(71) Applicant: ZTE CORPORATION, Guangdong (CN)

(72) Inventors: Shuqiang Xia, Shenzhen (CN); Feng Xie, Shenzhen (CN); Ying Liu, Shenzhen (CN); Tao Qi, Shenzhen (CN); Yan Xue, Shenzhen (CN); Kun Cao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 525 days.

(21) Appl. No.: 17/547,837

(22) Filed: Dec. 10, 2021

(65) Prior Publication Data

US 2022/0104191 A1 Mar. 31, 2022

Related U.S. Application Data

(63) Continuation of application No. PCT/CN2019/090668, filed on Jun. 11, 2019.

(51) Int. Cl.
*H04W 72/20* (2023.01)
*H04W 74/0833* (2024.01)

(52) U.S. Cl.
CPC ....... *H04W 72/20* (2023.01); *H04W 74/0833* (2013.01)

(58) Field of Classification Search
CPC ............. H04W 72/20; H04W 74/0833; H04W 72/0453; H04W 72/21; H04W 72/23
See application file for complete search history.

(56) References Cited

U.S. PATENT DOCUMENTS 10,542,506 B2 * 1/2020 Liu .................. H04W 74/0833
2014/0328283 A1 11/2014 Wan et al.
(Continued)

FOREIGN PATENT DOCUMENTS

CN 101778393 A 7/2010
CN 104272636 A 1/2015
(Continued)

OTHER PUBLICATIONS

International Search Report and Written Opinion for PCT Appl. No. PCT/CN2019/090668, mailed Mar. 12, 2020 (6 pages).
(Continued)

*Primary Examiner* — Abdullahi Ahmed
(74) *Attorney, Agent, or Firm* — Foley & Lardner LLP

(57) ABSTRACT

Methods, apparatus and systems for transmitting data using bandwidth parts in a wireless communication are disclosed. In one embodiment, a method performed by a wireless communication node is disclosed. The method comprises: configuring a first set of bandwidth part (BWP) for a wireless communication device, wherein the first set of BWP includes a single BWP configured for either uplink or downlink transmission regarding the wireless communication device; and configuring at least one second set of BWPs for the wireless communication device, wherein each of the second set of BWPs includes a pair of BWPs configured respectively for uplink and downlink transmissions regarding the wireless communication device. The first set of BWP is associated with the at least one second set of BWPs based on at least one predetermined relationship.

18 Claims, 5 Drawing Sheets

(56) References Cited

U.S. PATENT DOCUMENTS

| | | |
|---|---|---|
| 2019/0132862 A1 | 5/2019 | Jeon et al. |
| 2020/0280421 A1* | 9/2020 | Choi .................... H04L 5/0048 |
| 2020/0351039 A1* | 11/2020 | Zhou .................... H04L 5/0098 |
| 2021/0168789 A1* | 6/2021 | Li ......................... H04W 72/51 |
| 2021/0314946 A1* | 10/2021 | Ang ....................... H04L 5/001 |
| 2022/0225394 A1* | 7/2022 | Tie ........................ H04L 5/001 |
| 2022/0330346 A1* | 10/2022 | Cirik ..................... H04W 24/08 |

FOREIGN PATENT DOCUMENTS

| | | |
|---|---|---|
| CN | 105612801 A | 5/2016 |
| CN | 108353460 A | 7/2018 |
| CN | 109150379 A | 1/2019 |
| CN | 109150479 A | 1/2019 |
| CN | 109152024 A | 1/2019 |
| EP | 2 797 355 A1 | 10/2014 |
| WO | WO-2018/228416 A1 | 12/2018 |
| WO | WO-2019/022473 A1 | 1/2019 |
| WO | WO-2019/083277 A1 | 5/2019 |

OTHER PUBLICATIONS

Ericsson (Rapporteur), "Summary of BWP linkage for Random Access", 3GPP TSG-RAN WG2 #101, Tdoc R2-1803871, Mar. 2, 2018, Athens, Greece (4 pages).

Mediatek Inc., "Text Proposal to support BWP Operation in 38.300", 3GPP TSG-RAN WG2 #100, R2-1712883, Dec. 1, 2017, Reno, USA (2 pages).

Office Action on KR Appl. No. 10-2022-7000456, dated Nov. 20, 2023 (with English translation, 6 pages).

Oppo, "The issue for implicit BWP linkage", 3GPP TSG-RAN2 #101 bis, R2-1804438, Apr. 20, 2018, Sanya, China (4 pages).

First Office Action for CN Appl. No. 201980097373.6, dated May 27, 2023 (with English translation, 22 pages).

Extended EP Search Report on EP 19932921.0 dated May 23, 2022 (8 pages).

* cited by examiner

METHODS, APPARATUS AND SYSTEMS FOR DATA TRANSMISSION USING BANDWIDTH PARTS

CROSS-REFERENCE TO RELATED APPLICATIONS

This application claims the benefit of priority under 35 U.S.C. § 120 as a continuation of PCT Patent Application No. PCT/CN2019/090668, filed on Jun. 11, 2019, the disclosure of which is incorporated herein by reference in its entirety.

TECHNICAL FIELD

The disclosure relates generally to wireless communications and, more particularly, to methods, apparatus and systems for transmitting data using bandwidth parts in a wireless communication.

BACKGROUND

In order to provide a larger system and a better user experience in a fifth-generation (5G) new radio (NR) network, NR base stations can often support a large bandwidth. For example, below 6 GHz, a NR base station can support a maximum bandwidth of 100 MHz by a single carrier; above 6 GHz, a NR base station can support a maximum bandwidth of 400 MHz by a single carrier.

Due to factors such as terminal cost, power consumption, and cell coverage, the base station can configure multiple sets of bandwidth parts (BWPs) for the terminal on one carrier. At a same time, the terminal in an existing system only activates one set of BWPs and uses this set for data reception and transmission. Here, each set of BWPs includes an uplink BWP and a downlink BWP. That is, the BWPs allocated by the base station to the terminal are paired. If the downlink BWP resource of a terminal is released or deactivated by the base station, the uplink BWP corresponding to the downlink BWP will also be released or deactivated.

Compared with a fourth-generation (4G) long-term evolution (LTE) system, the application scenarios, service types, and spectrum supported by the NR system are more diverse. For example, some terminals only support downlink service reception, and some terminals support two-way services, one-way services, and even both. The uplink and downlink carriers may have different attributes, where the downlink carrier is a licensed carrier and the uplink carrier is an un-licensed carrier. Correspondingly, for the set of BWPs allocated by the base station to the terminal, the downlink BWP and the uplink BWP are on the licensed and unlicensed carriers, respectively. Due to the huge difference in spectrum usage rules and interference conditions, according to an existing method of using BWP in a NR system, the downlink BWP will often be deactivated due to a deactivation of the uplink BWP. This induces very large negative effects on the user experience and spectral efficiency of the wireless system.

Thus, existing systems and methods for BWP allocation in a wireless communication are not entirely satisfactory.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a wireless communication node is disclosed. The method comprises: configuring a first set of bandwidth part (BWP) for a wireless communication device, wherein the first set of BWP includes a single BWP configured for either uplink or downlink transmission regarding the wireless communication device; and configuring at least one second set of BWPs for the wireless communication device, wherein each of the second set of BWPs includes a pair of BWPs configured respectively for uplink and downlink transmissions regarding the wireless communication device. The first set of BWP is associated with the at least one second set of BWPs based on at least one predetermined relationship.

In a further embodiment, a method performed by a wireless communication device is disclosed. The method comprises: receiving a configuration of a first set of bandwidth part (BWP) from a wireless communication node, wherein the first set of BWP includes a single BWP configured for either uplink or downlink transmission regarding the wireless communication device; and receiving a configuration of at least one second set of BWPs from the wireless communication node, wherein each of the second set of BWPs includes a pair of BWPs configured respectively for uplink and downlink transmissions regarding the wireless communication device. The first set of BWP is associated with the at least one second set of BWPs based on at least one predetermined relationship.

In a different embodiment, a wireless communication node configured to carry out a disclosed method in some embodiment is disclosed.

In yet another embodiment, a wireless communication device configured to carry out a disclosed method in some embodiment is disclosed.

In still another embodiment, a non-transitory computer-readable medium having stored thereon computer-executable instructions for carrying out a disclosed method in some embodiment is disclosed.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
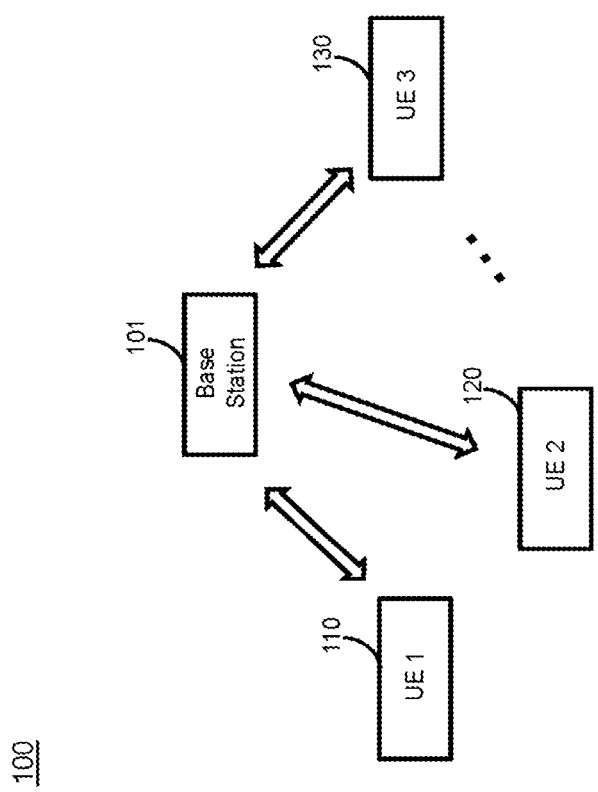
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides a geographical radio coverage, and one or more wireless user equipment devices (typically known as a "UE") that can transmit and receive data within the radio coverage. The present teaching discloses a method for configuring a bandwidth part (BWP) that is not paired for a UE on a carrier. In one embodiment, a BS configures for a UE a first type BWP and at least one set of second type BWPs. Each set of the second type BWPs comprises a downlink BWP and a corresponding uplink BWP. At most one set of the second type BWPs has active status at a time.

The first type BWP and the second type BWP have a predetermined relationship including one or more of the following: (1) if a set of second type BWPs is activated, the first type BWP is also activated; and (2) if all sets of second type BWPs are deactivated, the first type BWP is also deactivated.

A first type BWP has no paired first type BWP corresponding to an opposite link direction. Alternatively, each first type BWP is paired with a second type BWP that is active and associated with the first type BWP based on the predetermined relationship. The first type BWP and the paired second type BWP have opposite link directions, one is uplink and the other is downlink. When the active second type BWP switches to a new BWP, the first type BWP may be paired with the new BWP. If the resource of a second type BWP paired with the first type BWP is released, the resource of the first type BWP is also released.

In one embodiment, the first type BWP and the second type BWP are on a same carrier. In another embodiment, the carrier of the first type BWP is a subset of the carriers of the second type BWPs. If the carrier of the second type BWP is a time division duplex (TDD) carrier, the first type BWP is located on the same carrier as the second type BWP; if the carriers of the second type BWPs are frequency division duplex (FDD) carriers, the carrier of first type BWP is either the uplink carrier or the downlink carrier in the carriers of the second type BWPs. For the carrier where the first type BWP is located, there are two active BWPs for the terminal. But at a same time, the terminal will use one of the two active BWPs for data reception or data transmission.

In one embodiment, the first type BWP is a downlink BWP. When the terminal initiates a random access on an uplink BWP of the second type BWPs, such as a random access preamble (PRACH) signal, the terminal expects that the base station does not transmit a random access response on the first type BWP paired with or associated with the uplink second type BWP. Correspondingly, the base station will send the random access response on a downlink BWP of the second type paired with the uplink second type BWP.

Further in another embodiment, the first type BWP is an uplink BWP. When the terminal initiates a random access on the uplink first type BWP, such as a random access preamble (PRACH) signal, the terminal expects that the base station will send the random access response on a downlink BWP of the second type paired with the uplink first type BWP.

The methods disclosed in the present teaching can be implemented in a wireless communication network, where a BS and a UE can communicate with each other via a communication link, e.g., via a downlink radio frame from the BS to the UE or via an uplink radio frame from the UE to the BS. In various embodiments, a BS in the present disclosure can be referred to as a network side and can include, or be implemented as, a next Generation Node B (gNB), an E-UTRAN Node B (eNB), a Transmission/Reception Point (TRP), an Access Point (AP), etc.; while a UE in the present disclosure can be referred to as a terminal and can include, or be implemented as, a mobile station (MS), a station (STA), etc. A BS and a UE may be described herein as non-limiting examples of "wireless communication nodes," and "wireless communication devices" respectively, which can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. Each UE may be configured with a first type BWP and one or more sets of second type BWPs. The first type BWP is a single BWP that is not paired with another first type BWP, but may be paired with an active second type BWP. Each set of second type BWPs includes a pair of BWPs with opposite link directions, one uplink BWP and one downlink BWP. The first type BWP and the second type BWPs have a predetermined relationship including one or more of the following: (1) if any set of second type BWPs is active, the first type BWP is also active; and (2) if all sets of second type BWPs are inactive, the first type BWP is also inactive. In one embodiment, a UE may be configured with multiple first type BWPs and one or more sets of second type BWPs. In this case, each first type BWP has the predetermined relationship with the second type BWPs and may be paired with an active second type BWP.

Figure 2:
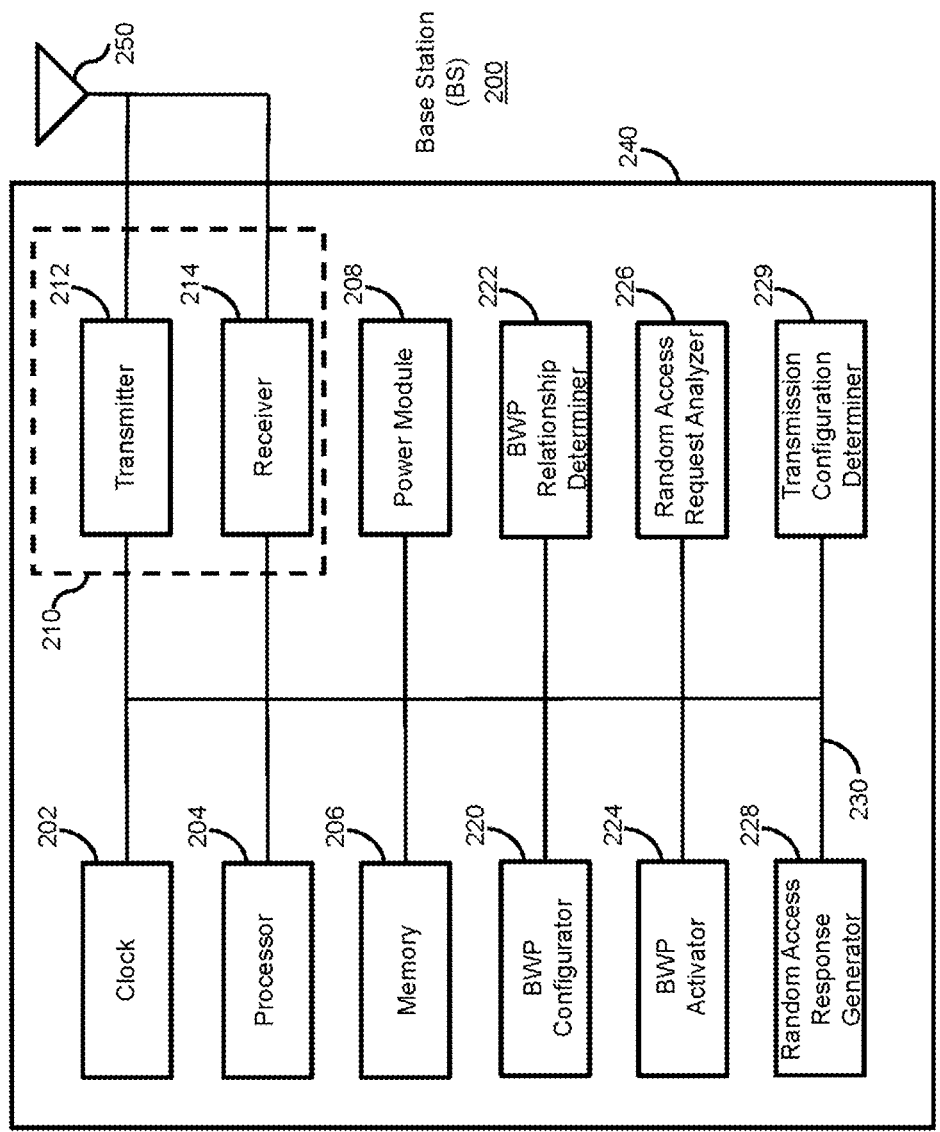
FIG. 2 illustrates a block diagram of a base station (BS), in accordance with some embodiments of the present disclosure.

FIG. 2 illustrates a block diagram of a base station (BS) 200, in accordance with some embodiments of the present disclosure. The BS 200 is an example of a node or device that can be configured to implement the various methods described herein. As shown in FIG. 2, the BS 200 includes a housing 240 containing a system clock 202, a processor 204, a memory 206, a transceiver 210 comprising a transmitter 212 and receiver 214, a power module 208, a BWP configurator 220, a BWP relationship determiner 222, a BWP activator 224, a random access request analyzer 226, a random access response generator 228 and a transmission configuration determiner 229.

In this embodiment, the system clock 202 provides the timing signals to the processor 204 for controlling the timing of all operations of the BS 200. The processor 204 controls the general operation of the BS 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc., which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the BS 200 to transmit and receive data to and from a remote device (e.g., a UE or another BS). An antenna 250 is typically attached to the housing 240 and electrically coupled to the transceiver 210. In various embodiments, the BS 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the BS 200 may transmit data to and receive data from a UE using BWPs. The BWP configurator 220 in this example can configure a first set of BWP for a UE and at least one second set of BWPs for the UE. The first set of BWP includes a single BWP configured for either uplink or downlink transmission regarding the UE; while each of the second set of BWPs includes a pair of BWPs configured respectively for uplink and downlink transmissions regarding the UE. The first set of BWP is associated with the at least one second set of BWPs based on at least one predetermined relationship.

In one embodiment, the BWP relationship determiner 222 can determine that the at least one predetermined relationship includes a relationship that: when one of the at least one second set of BWPs is active, the first set of BWP is also active. When the active BWP in the first set is for downlink transmission, the active BWP is associated with an active uplink BWP in the second set; and when the active BWP in the first set is for uplink transmission, the active BWP is associated with an active downlink BWP in the second set. There are two active BWPs configured for the UE; and the UE utilizes one of the two active BWPs once upon a time for data communication.

In another embodiment, the BWP relationship determiner 222 can determine that the at least one predetermined relationship includes a relationship that: when all of the at least one second set of BWPs are inactive, the first set of BWP is also inactive. In yet another embodiment, the BWP relationship determiner 222 can determine that the at least one predetermined relationship includes a relationship that: when resources of all of the at least one second set of BWPs are released, resource of the first set of BWP is also released.

In one embodiment, the random access request analyzer 226 receives, via the receiver 214, a request for random access from the UE on an uplink BWP in the second set. In this case, the active BWP in the first set is for downlink transmission. After the random access request analyzer 226 analyzes the request and forwards it to the random access response generator 228, the random access response generator 228 in this example can generate and transmit, via the transmitter 212, a response for the random access to the UE on a downlink BWP in the second set.

In another embodiment, the random access request analyzer 226 receives, via the receiver 214, a request for random access from the UE on the active BWP in the first set. In this case, the active BWP in the first set is for uplink transmission. After the random access request analyzer 226 analyzes the request and forwards it to the random access response generator 228, the random access response generator 228 in this example can generate and transmit, via the transmitter 212, a response for the random access to the UE on a downlink BWP in the second set.

When the UE is in a time division duplex (TDD) system, the first set of BWP and the at least one second set of BWPs are on a same carrier. When the UE is in a frequency division duplex (FDD) system, the pair of BWPs in each of the second set of BWPs are on a first carrier and a second carrier, respectively for uplink and downlink transmissions; the first set of BWP is on the first carrier when the first set of BWP is for uplink transmission; and the first set of BWP is on the second carrier when the first set of BWP is for downlink transmission.

In one embodiment, the first set of BWP is configured for an uplink transmission of: a hybrid automatic repeat request (HARD), a channel state information (CSI), and/or a scheduling request (SR). A control resource set (CORESET) of the single BWP in the first set may be on an active BWP in the at least one second set. The CORESET of the single BWP in the first set has same numbers of symbols and resource blocks as those of a CORESET of the active BWP in the at least one second set. When the active BWP in the at least one second set changes to a new BWP, the CORESET of the single BWP in the first set has same numbers of symbols and resource blocks as those of a CORESET of the new BWP.

In another embodiment, a CORESET of the single BWP in the first set is on the single BWP. The CORESET of the single BWP in the first set has same numbers of symbols and resource blocks as those of a CORESET of an active BWP in the at least one second set. When the active BWP in the at least one second set changes to a new BWP, the CORESET of the single BWP in the first set has same numbers of symbols and resource blocks as those of a CORESET of the new BWP.

In yet another embodiment, the at least one second set of BWPs comprises at least two sets of BWPs that are different from each other. They may have different resource mapping manners of their control resource sets (CORESETs) and/or different bundle sizes of their CORESETs. When an active BWP in the at least one second set changes to a new BWP, the single BWP in the first set changes its resource mapping manner of CORESET and/or bundle size of CORESET accordingly based on the new BWP's resource mapping manner of CORESET and/or bundle size of CORESET.

The BWP activator 224 in this example may activate or deactivate a BWP configured for the UE. Among the at least one second set of BWPs, at most one set of BWPs is active at any time. In one embodiment, the BWP activator 224 may activate the single BWP in the first set based on a first signaling and/or a second signaling. The first signaling is specifically configured for activating the single BWP; and the second signaling is configured for activating a BWP that is in the at least one second set and associated with or paired with the single BWP. The UE performs detection on a control channel of the activated single BWP based on a BWP configuration associated with a latest signaling received by the UE for activating the single BWP. The latest signaling may be either the first signaling or the second signaling, whichever received last by the UE.

The transmission configuration determiner 229 in this example may determine a configuration to be utilized for a transmission on a physical shared channel using an overlapping time frequency resource. The overlapping time frequency resource belongs to both the single BWP in the first set and a second BWP in the at least one second set. When both the single BWP and the second BWP are active, the configuration is determined based on a predetermined one of the single BWP and the second BWP. In another embodiment, when both the single BWP and the second BWP are active, the configuration is determined based on a search space of a physical control channel corresponding to the physical shared channel. In one example, if the search space of the physical control channel belongs to a search space of the single BWP, the configuration follows a configuration of the single BWP. In another example, if the search space of the physical control channel belongs to a search space of the second BWP, the configuration follows a configuration of the second BWP.

The power module 208 can include a power source such as one or more batteries, and a power regulator, to provide regulated power to each of the above-described modules in FIG. 2. In some embodiments, if the BS 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the BS 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the BWP configurator 220. Conversely, each of the modules illustrated in FIG. 2 can be implemented using a plurality of separate components or elements.

Figure 3:
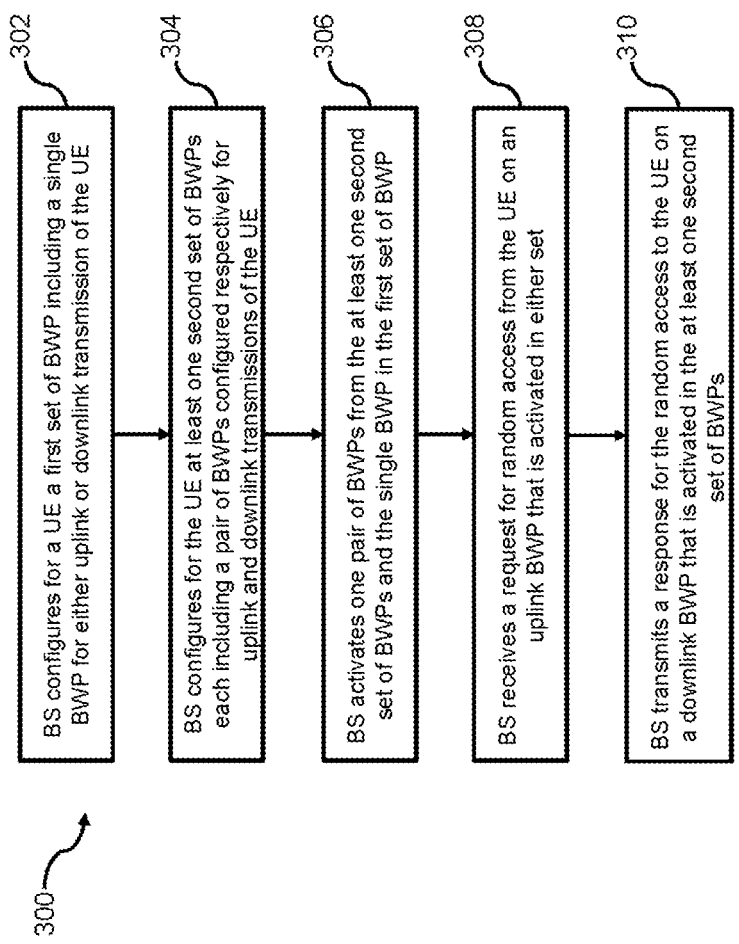
FIG. 3 illustrates a flow chart for a method performed by a BS for data transmission using bandwidth parts, in accordance with some embodiments of the present disclosure.

FIG. 3 illustrates a flow chart for a method 300 performed by a BS, e.g. the BS 200 in FIG. 2, for data transmission using BWPs, in accordance with some embodiments of the present disclosure. At operation 302, the BS configures for a UE a first set of BWP including a single BWP for either uplink or downlink transmission of the UE. At operation 304, the BS configures for the UE at least one second set of BWPs each including a pair of BWPs configured respectively for uplink and downlink transmissions of the UE. The BS activates at operation 306 one pair of BWPs from the at least one second set and the single BWP in the first set. At operation 308, the BS receives a request for random access from the UE on an uplink BWP that is activated in either set. At operation 310, the BS transmits a response for the random access to the UE on a downlink BWP that is activated in the second set. The order of the steps shown in FIG. 3 may be changed according to different embodiments of the present disclosure.

Figure 4:
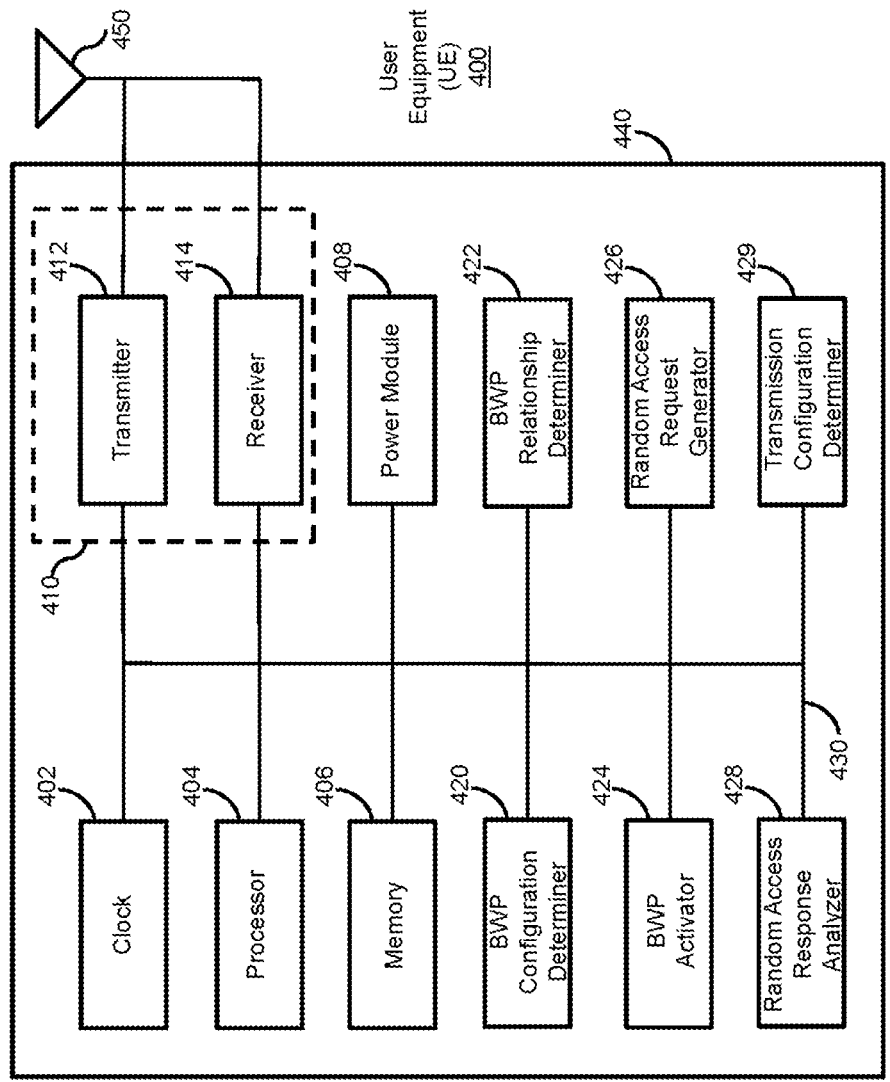
FIG. 4 illustrates a block diagram of a user equipment (UE), in accordance with some embodiments of the present disclosure.

FIG. 4 illustrates a block diagram of a UE 400, in accordance with some embodiments of the present disclosure. The UE 400 is an example of a device that can be configured to implement the various methods described herein. As shown in FIG. 4, the UE 400 includes a housing 440 containing a system clock 402, a processor 404, a memory 406, a transceiver 410 comprising a transmitter 412 and a receiver 414, a power module 408, a BWP configuration determiner 420, a BWP relationship determiner 422, a BWP activator 424, a random access request generator 426, a random access response analyzer 428, and a transmission configuration determiner 429.

In this embodiment, the system clock 402, the processor 404, the memory 406, the transceiver 410 and the power module 408 work similarly to the system clock 202, the processor 204, the memory 206, the transceiver 210 and the power module 208 in the BS 200. An antenna 450 or a multi-antenna array 450 is typically attached to the housing 440 and electrically coupled to the transceiver 410.

The BWP configuration determiner 420 in this example may receive from a BS a first set of BWP and at least one second set of BWPs. The first set of BWP includes a single BWP configured for either uplink or downlink transmission regarding the UE 400; while each of the second set of BWPs includes a pair of BWPs configured respectively for uplink and downlink transmissions regarding the UE 400. The first set of BWP is associated with the at least one second set of BWPs based on at least one predetermined relationship.

In one embodiment, the BWP relationship determiner 422 can determine that the at least one predetermined relationship includes a relationship that: when one of the at least one second set of BWPs is active, the first set of BWP is also active. When the active BWP in the first set is for downlink transmission, the active BWP is associated with an active uplink BWP in the second set; and when the active BWP in the first set is for uplink transmission, the active BWP is associated with an active downlink BWP in the second set. There are two active BWPs configured for the UE 400; and the UE 400 utilizes one of the two active BWPs once upon a time for data communication.

In another embodiment, the BWP relationship determiner 422 can determine that the at least one predetermined relationship includes a relationship that: when all of the at least one second set of BWPs are inactive, the first set of BWP is also inactive. In yet another embodiment, the BWP relationship determiner 422 can determine that the at least one predetermined relationship includes a relationship that: when resources of all of the at least one second set of BWPs are released, resource of the first set of BWP is also released.

In one embodiment, the random access request generator 426 generates and transmits, via the transmitter 412, a request for random access to the BS on an uplink BWP in the second set. In this case, the active BWP in the first set is for downlink transmission. Then the random access response analyzer 428 in this example can receive, via the receiver 414, and analyze a response for the random access from the BS on a downlink BWP in the second set.

In another embodiment, the random access request generator 426 generates and transmits, via the transmitter 412, a request for random access to the BS on the active BWP in the first set. In this case, the active BWP in the first set is for uplink transmission. Then the random access response analyzer 428 in this example can receive, via the receiver 414, and analyze a response for the random access from the BS on a downlink BWP in the second set.

When the UE 400 is in a time division duplex (TDD) system, the first set of BWP and the at least one second set of BWPs are on a same carrier. When the UE 400 is in a frequency division duplex (FDD) system, the pair of BWPs in each of the second set of BWPs are on a first carrier and a second carrier, respectively for uplink and downlink transmissions; the first set of BWP is on the first carrier when the first set of BWP is for uplink transmission; and the first set of BWP is on the second carrier when the first set of BWP is for downlink transmission.

In one embodiment, the first set of BWP is configured for an uplink transmission of: a hybrid automatic repeat request (HARD), a channel state information (CSI), and/or a scheduling request (SR). A control resource set (CORESET) of the single BWP in the first set may be on an active BWP in the at least one second set. The CORESET of the single BWP in the first set has same numbers of symbols and resource blocks as those of a CORESET of the active BWP in the at least one second set. When the active BWP in the at least one second set changes to a new BWP, the CORESET of the single BWP in the first set has same numbers of symbols and resource blocks as those of a CORESET of the new BWP.

In another embodiment, a CORESET of the single BWP in the first set is on the single BWP. The CORESET of the single BWP in the first set has same numbers of symbols and resource blocks as those of a CORESET of an active BWP in the at least one second set. When the active BWP in the at least one second set changes to a new BWP, the CORESET of the single BWP in the first set has same numbers of symbols and resource blocks as those of a CORESET of the new BWP.

In yet another embodiment, the at least one second set of BWPs comprises at least two sets of BWPs that are different from each other. They may have different resource mapping manners of their control resource sets (CORESETs) and/or different bundle sizes of their CORESETs. When an active BWP in the at least one second set changes to a new BWP, the single BWP in the first set changes its resource mapping manner of CORESET and/or bundle size of CORESET accordingly based on the new BWP's resource mapping manner of CORESET and/or bundle size of CORESET.

The BWP activator 424 in this example may activate or deactivate a BWP configured for the UE 400. Among the at least one second set of BWPs, at most one set of BWPs is active at any time. In one embodiment, the BWP activator 424 may activate the single BWP in the first set based on a first signaling and/or a second signaling. The first signaling is specifically configured for activating the single BWP; and the second signaling is configured for activating a BWP that is in the at least one second set and associated with or paired with the single BWP. The UE 400 may perform detection on a control channel of the activated single BWP based on a BWP configuration associated with a latest signaling received by the UE 400 for activating the single BWP. The latest signaling may be either the first signaling or the second signaling, whichever received last by the UE 400.

The transmission configuration determiner 429 in this example may determine a transmission configuration to be utilized for a transmission on a physical shared channel using an overlapping time frequency resource. The overlapping time frequency resource belongs to both the single BWP in the first set and a second BWP in the at least one second set. When both the single BWP and the second BWP are active, the configuration is determined based on a predetermined one of the single BWP and the second BWP. In another embodiment, when both the single BWP and the second BWP are active, the configuration is determined based on a search space of a physical control channel corresponding to the physical shared channel. In one example, if the search space of the physical control channel belongs to a search space of the single BWP, the configuration follows a configuration of the single BWP. In another example, if the search space of the physical control channel belongs to a search space of the second BWP, the configuration follows a configuration of the second BWP.

The various modules discussed above are coupled together by a bus system 430. The bus system 430 can include a data bus and, for example, a power bus, a control signal bus, and/or a status signal bus in addition to the data bus. It is understood that the modules of the UE 400 can be operatively coupled to one another using any suitable techniques and mediums.

Although a number of separate modules or components are illustrated in FIG. 4, persons of ordinary skill in the art will understand that one or more of the modules can be combined or commonly implemented. For example, the processor 404 can implement not only the functionality described above with respect to the processor 404, but also implement the functionality described above with respect to the BWP configuration determiner 420. Conversely, each of the modules illustrated in FIG. 4 can be implemented using a plurality of separate components or elements.

Figure 5:
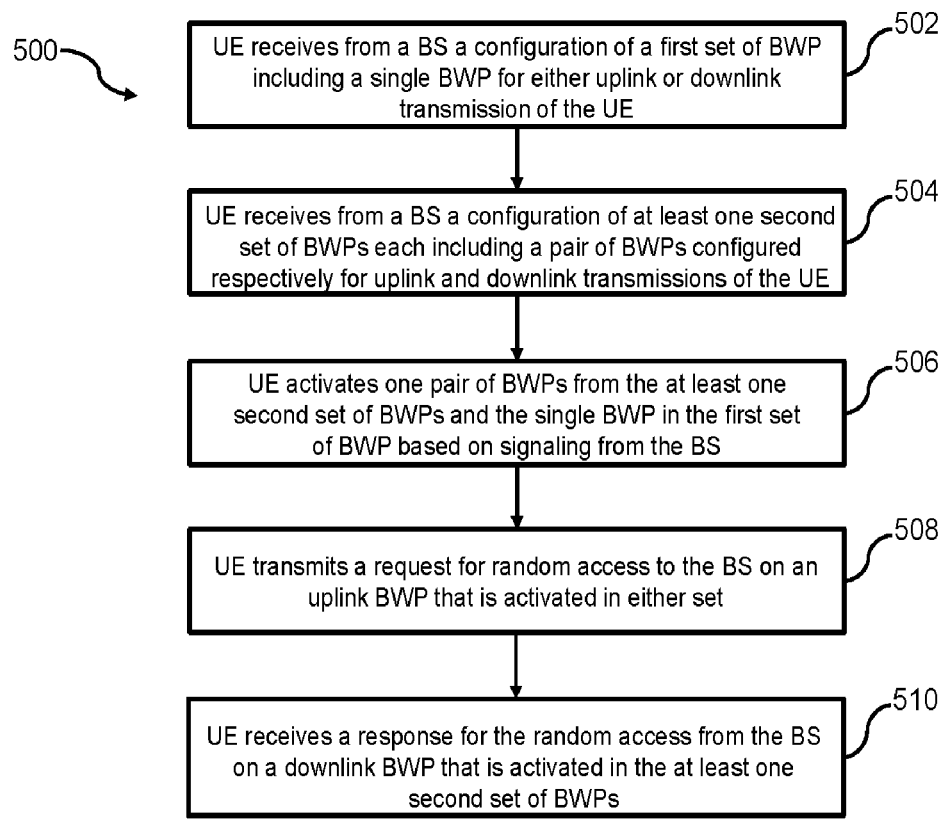
FIG. 5 illustrates a flow chart for a method performed by a UE for data transmission using bandwidth parts, in accordance with some embodiments of the present disclosure.

FIG. 5 illustrates a flow chart for a method 500 performed by a UE, e.g. the UE 400 in FIG. 4, for data transmission using BWPs, in accordance with some embodiments of the present disclosure. At operation 502, the UE receives from a BS a configuration of a first set of BWP including a single BWP for either uplink or downlink transmission of the UE. At operation 504, the UE receives from a BS a configuration of at least one second set of BWPs each including a pair of BWPs configured respectively for uplink and downlink transmissions of the UE. At operation 506, the UE activates one pair of BWPs from the at least one second set and the single BWP in the first set based on signaling from the BS. At operation 508, the UE transmits a request for random access to the BS on an uplink BWP that is activated in either set. At operation 510, the UE receives a response for the random access from the BS on a downlink BWP that is activated in the second set. The order of the steps shown in FIG. 5 may be changed according to different embodiments of the present disclosure.

Different embodiments of the present disclosure will now be described in detail hereinafter. It is noted that the features of the embodiments and examples in the present disclosure may be combined with each other in any manner without conflict.

In a first embodiment, a BS configures for a UE a first type BWP and at least one set of second type BWPs. Each set of the second type BWPs comprises a downlink BWP and a corresponding uplink BWP. At most one set of the second type BWPs has active status at a time.

The first type BWP and the second type BWP have a predetermined relationship including one or more of the following: (1) if a set of second type BWPs is active, the first type BWP is also active; and (2) if all sets of second type BWPs are inactive, the first type BWP is also inactive.

A first type BWP has no paired first type BWP corresponding to an opposite link direction. In other words, each first type BWP is paired with a second type BWP that is active and associated with the first type BWP based on the predetermined relationship. The first type BWP and the paired second type BWP have opposite link directions, one is uplink and the other is downlink. When the active second type BWP switches to a new BWP, the first type BWP will be paired with the new BWP. If the resource of a second type BWP paired with the first type BWP is released, the resource of the first type BWP is also released.

In one example, the first type BWP and the second type BWP are on a same carrier. In another example, the carrier of the first type BWP is a subset of the carriers of the second type BWPs. If the carrier of the second type BWP is a TDD carrier, the first type BWP is located on the same carrier as the second type BWP; if the carriers of the second type BWPs are FDD carriers, the carrier of first type BWP is either the uplink carrier or the downlink carrier in the carriers of the second type BWPs. For the carrier where the first type BWP is located, there are two active BWPs for the terminal. But at a same time, the terminal will use one of the two active BWPs for data reception or data transmission.

In one example, the first type BWP is a downlink BWP. When the terminal initiates a random access on an uplink BWP of the second type BWPs, such as a random access preamble (PRACH) signal, the terminal expects that the base station does not transmit a random access response on the first type BWP paired with or associated with the uplink BWP. Correspondingly, the base station will send the random access response on a downlink BWP of the second type paired with the uplink BWP.

Further in another example, the first type BWP is an uplink BWP. When the terminal initiates a random access on the uplink first type BWP, such as a random access preamble (PRACH) signal, the terminal expects that the base station will send the random access response on a downlink BWP of the second type paired with the uplink first type BWP.

In one scenario, whether the first type BWP is active or inactive does not impact the associated second type BWP.

In one example, the base station configures a set of first type BWP (hereinafter "BWP 1-1") and 2 sets of second type BWPs (hereinafter "BWP 2-1" and "BWP 2-2") for the terminal. In this example, BWP 1-1 has a predetermined relationship with both BWP 2-1 and BWP 2-2. In a TDD system, the uplink and downlink BWPs included in the BWP 2-1 and BWP 2-2 are on a same carrier (referred to as "carrier C"). Correspondingly, BWP 1-1 is also on carrier C. In a FDD system, the downlink BWPs included in the BWP 2-1 and BWP 2-2 are on a downlink carrier (referred to as "carrier C1"); and the uplink BWPs included in the BWP 2-1 and BWP 2-2 are on an uplink carrier (referred to as "carrier C2"). If BWP 1-1 is used to transmit data to the terminal, BWP 1-1 is on carrier C1; and if BWP 1-1 is used for the terminal to transmit data, BWP 1-1 is on carrier C2.

For example, BWP 1-1 may be used to support the base station to send the downlink ultra-reliable low-latency communications (URLLC) service to the terminal. The BWP 1-1 has a corresponding BWP with opposite link direction. BWP 2-1 and BWP 2-2 are used to support bidirectional enhanced mobile broadband (eMBB) services. In an initial stage, BWP2-1 is active, and BWP 1-1 is also active. The corresponding BWP with opposite link direction of BWP 1-1 is the uplink BWP in the BWP 2-1. The uplink BWP can be used for BWP 1-1 related channel measurement feedback, HARQ feedback, etc. After a period of time, the terminal is switched from BWP 2-1 to BWP 2-2 due to a change of eMBB service. In this process, BWP 2-1 changes from active state to inactive state; and BWP 2-2 changes from inactive state to active state. BWP 1-1 is still active. But the corresponding BWP with opposite link direction of BWP 1-1 becomes the uplink BWP in the BWP 2-2. After a while, the base station deactivates both BWP 2-1 and BWP 2-2. Since BWP 1-1 is only associated with BWP 2-1 and BWP 2-2, BWP 1-1 is also deactivated. After a while, the base station releases the resources of BWP 2-1 and BWP 2-2, which may be released at a same time or at different times. Then the resources of BWP 1-1 are also released.

In this embodiment, the first type BWP is associated with multiple second type BWPs. The active state of the first type BWP does not change as the active second type BWP switches. This can well preserve the service continuity on the first type BWP while saving signaling overhead. The above example can also be applied to scenarios where the downlink BWP of the second type BWP is on a licensed spectrum and the uplink BWP of the second type BWP is on an un-licensed spectrum. Further, depending on the service needs, the first type BWP may have no corresponding BWP with the opposite direction at all, where the technical effects of the above scenarios still exist.

In a second embodiment, a first type BWP is dedicated to transmitting uplink control information. A BS configures for a UE a first type BWP and at least one set of second type BWPs. Each set of the second type BWPs comprises a downlink BWP and a corresponding uplink BWP. At most one set of these second type BWPs has active status at a time.

The first type BWP and the second type BWP have a predetermined relationship including one or more of the following: (1) if a set of second type BWPs is active, the first type BWP is also active; and (2) if all sets of second type BWPs are inactive, the first type BWP is also inactive.

Further, the first type BWP is a BWP dedicated for the terminal to transmit one or more of: hybrid automatic repeat request (HARQ), channel state information (CSI), scheduling request (SR), etc. When the terminal needs to send one of the above information, and the terminal does not have a physical uplink shared channel (PUSCH) to transmit on its second type BWP at this time, the terminal use the above mentioned first type BWP to transmit the information. Otherwise, when the terminal has a PUSCH to transmit on its second type BWP, the information is transmitted on the PUSCH of the second type BWP. In this embodiment, regardless how the second type BWP switches, so long as the terminal does not have a PUSCH to transmit on its second type BWP, one or more of HARQ, CSI, SR information are transmitted on a fixed BWP. This mechanism can effectively reduce the impact on the service data scheduling while improving the performance of HARQ, CSI, SR, etc.

Unless otherwise contradicted by this embodiment, the first type BWP and the second type BWP in this embodiment may also have all or part of the properties and relationships described in other embodiments of the present specification. The same applies to other embodiments.

In a third embodiment, a design of a control resource set (CORESET) of a first type BWP is discussed. A BS configures for a UE a first type BWP and at least one set of second type BWPs. Each set of the second type BWPs comprises a downlink BWP and a corresponding uplink BWP. At most one set of these second type BWPs has active status at a time.

The first type BWP and the second type BWP have a predetermined relationship including one or more of the following: (1) if a set of second type BWPs is active, the first type BWP is also active; and (2) if all sets of second type BWPs are inactive, the first type BWP is also inactive.

The CORESET time-frequency information is used to indicate, in the time domain and the frequency domain, range information of resources that can be used to transmit physical downlink control channel (PDCCH). The time domain range is represented by the number of symbols; and the frequency domain range is represented by the number of resource blocks. The CORESET time-frequency information of the first type BWP is the same as the CORESET time-frequency information of the activated or active second type BWP and these CORESET time-frequency information are on a same BWP. Below are some examples for illustration.

In a first example, the base station configures for the terminal one set of first type BWP (referred to as "BWP 1") and K sets of second type BWPs (referred to as "BWP 2-1", "BWP 2-2" "BWP 2-K"), where K is a positive integer not less than 1. It is assumed the CORESET of BWP 2-$k$ comprises s(k) symbols and r(k) resource blocks, k=1 . . . K. When BWP 2-$k$ is activated, the CORESET of BWP 1 is on BWP 2-$k$ and includes s(k) symbols and r(k) resource blocks just like the CORESET of the BWP 2-$k$. If the terminal-activated second type BWP is switched from BWP 2-$k$ to BWP 2-$j$ (j, k are positive integers, and j is not equal to k), the CORESET of BWP 1 is changed to be on BWP 2-$j$. In addition, the CORESET time-frequency information of the BWP 1 is the same as the CORESET time-frequency information of BWP 2-$j$, such that they both include s(j) symbols and r(j) resource blocks.

In a second example, the base station configures for the terminal one set of first type BWP (referred to as "BWP 1") and K sets of second type BWPs (referred to as "BWP 2-1", "BWP 2-2" . . . "BWP 2-K"), where K is a positive integer not less than 1. It is assumed the CORESET of BWP 2-$k$ comprises s(k) symbols and r(k) resource blocks, k=1 . . . K. When BWP 2-$k$ is activated, the CORESET of BWP 1 is on BWP 1 and its CORESET time-frequency information is the same as the CORESET time-frequency information of BWP 2-$k$. That is, the CORESET of BWP 1 also includes s(k) symbols and r(k) resource blocks. If the activated BWP of the second type BWP at the terminal is switched from BWP 2-$k$ to BWP 2-$j$ (j, k are positive integers, and j is not equal to k), the CORESET of BWP 1 remains on BWP 1. But the values of the CORESET time-frequency information are changed to be the same as the values of the CORESET time-frequency information of BWP 2-$j$. That is, the CORESET of BWP 1 includes s(j) symbols and r(j) resource blocks. In this example, while the CORESET time-frequency information of BWP 1 has same value as the CORESET time-frequency information of the second type BWP, the two CORESETs may not be on a same BWP. That is, the CORESET of the second type BWP may be on the first type BWP or on its own BWP, which may be determined by the configuration of the base station.

Further, when the base station configures for the terminal multiple sets of second type BWPs, the resource mapping manners or modes and/or bundle sizes of the CORESETs of these BWPs may be different. For example, a CORESET of one BWP uses interleaving mapping mode, while a CORESET of another BWP uses a non-interleaving mapping mode. For example, a CORESET of one BWP has a bundle size of 2 control channel elements (CCEs), while a CORESET of another BWP has a bundle size of 6 CCEs. In some embodiments, the resource mapping manner or bundle size of the first type BWP may also vary according to the change of the active second type BWP. That is, the configuration of the first type BWP follows the configuration of the latest activated second type BWP.

In this embodiment, the CORESETs of the first type BWP and the second type BWPs may have the same time-frequency values and be on a same BWP. The CORESET of the first type BWP has a configuration that changes as the CORESET configuration of the activated second type BWP varies. This mechanism simplifies the configuration overhead of the first type BWP and makes the CORESET of the first type BWP very flexible. This is ideal for situations where two types of BWPs cooperate to support transmission of a same type of service.

In a fourth embodiment, how to switch CORESET configuration of a first type BWP is discussed. A BS configures for a UE a first type BWP and at least one set of second type BWPs. Each set of the second type BWPs comprises a downlink BWP and a corresponding uplink BWP. At most one set of these second type BWPs has active status at a time. The first type BWP and the second type BWP have a predetermined relationship including one or more of the following: (1) if a set of second type BWPs is active, the first type BWP is also active; and (2) if all sets of second type BWPs are inactive, the first type BWP is also inactive.

Furthermore, for the first type BWP, the base station may activate the first type BWP by either activating the associated second type BWP or using a dedicated activation signaling to activate the first type BWP. At the receiving end, the terminal determines the CORESET configuration after the activation of the first type BWP, according to the last received activation signaling, which may be the dedicated activation signaling or an activation signaling for activating the associated second type BWP.

For example, the base station configures for the terminal a first type BWP (referred to as "BWP 1") and two sets of the second type BWP (referred to as "BWP 2-1" and "BWP 2-2" respectively). The CORESET configuration corresponding to these BWP are referred to as Config 1, Config 2-1 and Config 2-2, respectively. The terminal first receives a dedicated activation signaling for activating the BWP 1. After the dedicated signaling takes effect, the terminal detects the control channel of the BWP 1 according to Config 1. After a period of time, the terminal receives a signaling for activating the BWP 2-1. After the signaling takes effect, the terminal detects the control channel of the BWP 1 according to Config 2-1. After a period of time, the terminal receives again the dedicated activation signaling for activating the BWP 1. After the dedicated signaling takes effect, the terminal detects the control channel of the BWP 1 according to Config 1. Then when the terminal receives the activation signaling for activating the BWP 2-2. After the signaling takes effect, the terminal detects the control channel of the BWP 1 according to Config 2-2.

In a fifth embodiment, how to handle an overlapping resource of the first type BWP and a second type BWP is discussed. A BS configures for a UE a first type BWP and at least one set of second type BWPs. Each set of the second type BWPs comprises a downlink BWP and a corresponding uplink BWP. At most one set of these second type BWPs has active status at a time. The first type BWP and the second type BWP have a predetermined relationship including one or more of the following: (1) if a set of second type BWPs is active, the first type BWP is also active; and (2) if all sets of second type BWPs are inactive, the first type BWP is also inactive.

Further, when the time-frequency resource of the first type BWP overlaps with the time-frequency resource of the second type BWP, the data transmission on physical downlink shared channel (PDSCH) or physical uplink shared channel (PUSCH) on the overlapping resources may follow one of the following principles.

According to a first principle, if the first type BWP and the second type BWP covering the overlapping resource are both active, the configuration of the transmitted PDSCH or PUSCH follows the configuration of the second type BWP. Alternatively, the base station predetermines and indicates in advance whether the transmitted PDSCH or PUSCH follows the first type BWP configuration or the second type BWP configuration in this case. When only one of the first type BWP and the second type BWP covering the overlapping resource is active, the configuration of the transmitted PDSCH or PUSCH follows the configuration of the active BWP, which may be either the first type BWP or the second type BWP.

According to a second principle, if the first type BWP and the second type BWP covering the overlapping resource are both active, the configuration of the transmitted PDSCH or PUSCH is determined based on a search space where a physical downlink control channel (PDCCH) is located, where the PDCCH corresponds to the transmitted PDSCH or PUSCH. If the PDCCH search space belongs to a search space of the first type BWP, then the configuration of the transmitted PDSCH or PUSCH follows the configuration of the first type BWP. If the PDCCH search space belongs to a search space of a second type BWP, then the configuration of the transmitted PDSCH or PUSCH follows the configuration of the second type BWP.

Further, when a search space of the PDCCH of the first type BWP overlaps with a search space of a PDCCH of the second type BWP, the configuration of the transmitted PDSCH or PUSCH follows the configuration of the second type BWP. Alternatively, the base station predetermines and indicates in advance whether the transmitted PDSCH or PUSCH follows the first type BWP configuration or the second type BWP configuration in this case.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication node, the method comprising:
configuring a first set of bandwidth part (BWP) for a wireless communication device, wherein the first set of BWP includes a single BWP configured for either uplink or downlink transmission regarding the wireless communication device; and
configuring at least one second set of BWPs for the wireless communication device, wherein each of the at least one second set of BWPs includes a pair of BWPs configured respectively for uplink and downlink transmissions regarding the wireless communication device,
wherein the first set of BWP is associated with the at least one second set of BWPs based on at least one predetermined relationship, in which when one of the pair of BWPs of at least one of the at least one second set of BWPs is active, the first set of BWP is active, wherein among the at least one second set of BWPs, at most one in the pair of BWPs is active.

2. The method of claim 1, wherein:
when the active BWP in the first set of BWP is for downlink transmission, the active BWP is associated with an active uplink BWP in the second set of BWPs; and
when the active BWP in the first set of BWP is for uplink transmission, the active BWP is associated with an active downlink BWP in the second set of BWPs.

3. The method of claim 1, wherein:
there are two active BWPs configured for the wireless communication device; and
the wireless communication device utilizes one of the two active BWPs upon a time for data communication.

4. The method of claim 1, further comprising:
receiving a request for random access from the wireless communication device on an uplink BWP in the second set of BWPs, wherein the active BWP in the first set of BWP is for downlink transmission; and
transmitting a response for the random access to the wireless communication device on a downlink BWP in the second set of BWPs.

5. The method of claim 1, further comprising:
receiving a request for random access from the wireless communication device on the active BWP in the first set of BWP, wherein the active BWP in the first set of BWP is for uplink transmission; and
transmitting a response for the random access to the wireless communication device on a downlink BWP in the second set of BWPs.

6. The method of claim 1, wherein the at least one predetermined relationship includes a relationship that:
when all of the at least one second set of BWPs are inactive, the first set of BWP is inactive.

7. The method of claim 1, wherein the at least one predetermined relationship includes a relationship that:
when all of the at least one second set of BWPs are released, the first set of BWP is released.

8. The method of claim 1, wherein:
when the wireless communication device is in a time division duplex (TDD) system, the first set of BWP and the at least one second set of BWPs are on a same carrier.

9. The method of claim 1, wherein when the wireless communication device is in a frequency division duplex (FDD) system,
the pair of BWPs in each of the second set of BWPs are on a first carrier and a second carrier, respectively for uplink and downlink transmissions;
the first set of BWP is on the first carrier when the first set of BWP is for uplink transmission; and
the first set of BWP is on the second carrier when the first set of BWP is for downlink transmission.

10. The method of claim 1, wherein the first set of BWP is configured for an uplink transmission of at least one selected from the group of: hybrid automatic repeat request (HARQ), channel state information (CSI), scheduling request (SR).

11. The method of claim 1, wherein:
a control resource set (CORESET) of the single BWP in the first set of BWP is on an active BWP in the at least one second set of BWPs;
the CORESET of the single BWP in the first set of BWP has same numbers of symbols and resource blocks as those of a CORESET of the active BWP in the at least one second set of BWPs; and
when the active BWP in the at least one second set of BWPs changes to a new BWP, the CORESET of the single BWP in the first set of BWP has same numbers of symbols and resource blocks as those of a CORESET of the new BWP.

12. The method of claim 1, wherein:
a control resource set (CORESET) of the single BWP in the first set of BWP is on the single BWP;
the CORESET of the single BWP in the first set of BWP has same numbers of symbols and resource blocks as those of a CORESET of an active BWP in the at least one second set of BWPs; and
when the active BWP in the at least one second set of BWPs changes to a new BWP, the CORESET of the single BWP in the first set of BWP has same numbers of symbols and resource blocks as those of a CORESET of the new BWP.

13. The method of claim 1, wherein:
the at least one second set of BWPs comprises at least two sets of BWPs that are different from each other, in terms of at least one selected from the group of: different resource mapping manners of their control resource sets (CORESETs), and different bundle sizes of their CORESETs; and
when an active BWP in the at least one second set of BWPs changes to a new BWP, the single BWP in the first set of BWP changes, based on the new BWP, at least one selected from the group of: resource mapping manner of CORESET, and bundle size of CORESET.

14. The method of claim 1, further comprising activating the single BWP in the first set of BWP based on at least one selected from the group of:
a first signaling configured for activating the single BWP; and
a second signaling configured for activating a BWP that is in the at least one second set of BWPs and associated with the single BWP, wherein the wireless communication device performs a detection on control channel of the activated single BWP based on a BWP configuration associated with a latest signaling received by the wireless communication device for activating the single BWP.

15. The method of claim 1, further comprising:
utilizing a configuration for a transmission on a physical shared channel using a time frequency resource that belongs to both the single BWP in the first set of BWP and a second BWP in the at least one second set of BWPs, wherein:
when both the single BWP and the second BWP are active, the configuration is determined based on a predetermined one of the single BWP and the second BWP.

16. The method of claim 1, further comprising:
utilizing a configuration for a transmission on a physical shared channel using a time frequency resource that belongs to both the single BWP in the first set of BWP and a second BWP in the at least one second set of BWPs, wherein:
when both the single BWP and the second BWP are active, the configuration is determined based on a search space of a physical control channel corresponding to the physical shared channel.

17. A method performed by a wireless communication device, the method comprising:
receiving a configuration of a first set of bandwidth part (BWP) from a wireless communication node, wherein the first set of BWP includes a single BWP configured for either uplink or downlink transmission regarding the wireless communication device; and
receiving a configuration of at least one second set of BWPs from the wireless communication node, wherein each of the at least one second set of BWPs includes a pair of BWPs configured respectively for uplink and downlink transmissions regarding the wireless communication device,
wherein the first set of BWP is associated with the at least one second set of BWPs based on at least one predetermined relationship, in which when one of the pair of BWPs of at least one of the at least one second set of BWPs is active, the first set of BWP is active, wherein among the at least one second set of BWPs, at most one in the pair of BWPs is active.

18. A wireless communication node comprising:
at least one processor configured to:
configure a first set of bandwidth part (BWP) for a wireless communication device, wherein the first set of BWP includes a single BWP configured for either uplink or downlink transmission regarding the wireless communication device; and
configure at least one second set of BWPs for the wireless communication device, wherein each of the at least one second set of BWPs includes a pair of BWPs configured respectively for uplink and downlink transmissions regarding the wireless communication device,
wherein the first set of BWP is associated with the at least one second set of BWPs based on at least one predetermined relationship, in which when one of the pair of BWPs of at least one of the at least one second set of BWPs is active, the first set of BWP is active, wherein among the at least one second set of BWPs, at most one in the pair of BWPs is active.

* * * * *